June 24, 1958 R. E. SEELY 2,840,772
MULTISPEED INDUCTION MOTOR
Filed June 6, 1957
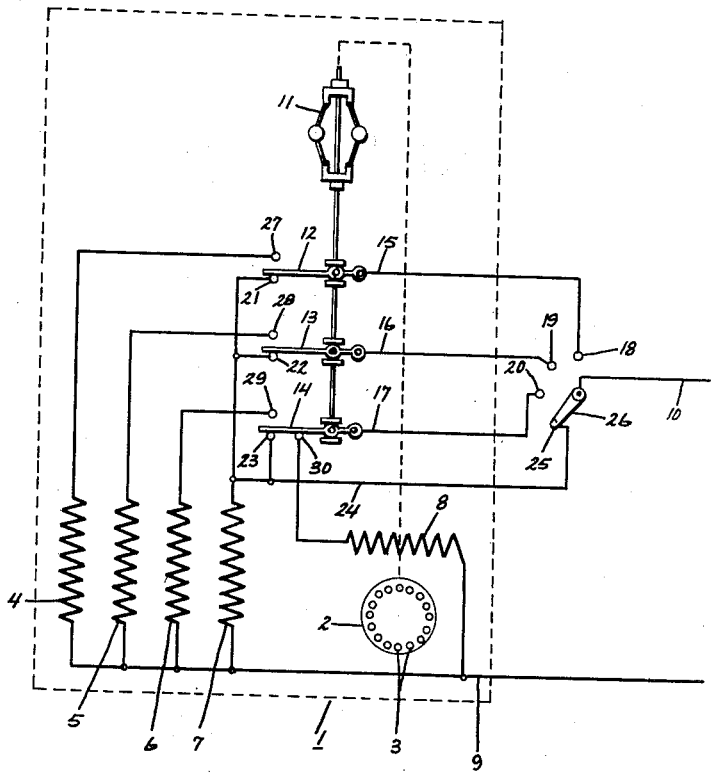
Inventor:
Richard E. Seely,
by Robert H. Irish
His Attorney.

United States Patent Office 2,840,772
Patented June 24, 1958

2,840,772

MULTISPEED INDUCTION MOTOR

Richard E. Seely, Fort Wayne, Ind., assignor to General Electric Company, a corporation of New York Application June 6, 1957, Serial No. 663,944

2 Claims. (Cl. 318—221)

This invention relates to dynamoelectric machines, and more particularly to a winding arrangement for use in multispeed induction-type motors.

In the past, most induction-type motors of the kind which use a start winding which is not connected during running have been of the one or two speed variety. The only known departure from this state of affairs has occurred where relatively light torques, especially those which vary proportionally with the speed of rotation—such as in fan loads—have been involved. In those cases, different speeds have been effected by adding main winding sections in series to provide slower speeds. However, the inherent limitations on the torque performance of such motors make it impractical where relatively high torques during starting are required. In such cases, to obtain effective performance, both at starting and at running, it has been found desirable to use different main windings for different speed operations with the starting always being effected on the start winding and one particular main winding wound to cooperate effectively with the start winding. The use of more than two speeds in such motors has effectively been precluded by the expected complexity of the circuitry.

It is, consequently, an object of this invention to provide an improved circuit for an induction motor of the type having a starting winding which is disconnected as the motor comes up to speed, where three or more speeds are readily obtainable through the use of relatively simple circuitry.

More particularly, it is an object of the invention to provide such a motor where the increased number of speeds is made possible by modifications in the speed responsive switch which is provided to control the disconnection of the start winding circuit.

In one aspect of the invention, there is provided a multispeed induction motor which has $n$ main windings, where $n$ is an integer of three or more, and a single start winding. The main windings and the start winding are all connected together at one end, as is conventional. A speed responsive switch arrangement is provided with $(n-1)$ contact arms, with each contact arm having a first operative position below a predetermined motor speed and a second operative position above the predetermined motor speed. $(n-1)$ main windings are respectively connected at their other ends to the contact arms when the arms are in their second operative position, and $n-1$ lines are permanently connected to the contact arms respectively. The other remaining main winding has its other end connected directly to another line, and also to all of the contact arms when they are in their first operative position. The other end of the start winding is connected to one of the contact arms when it is in its first operative position. With this arrangement, and with the one end of the windings connected to one side of a suitable source of alternating current power, a suitable motor speed may be selected by selecting any one of the lines to be connected to the other side of the power source. The motor will start on the start winding and on the main winding which is connected directly to a line; when the predetermined speed is reached, the motor will then continue to run on whatever main winding is connected to the selected line.

The features of the invention which are believed to be novel are set forth with particularity in the appended claims. The invention itself, however, both as to its organization and method of operation together with further objects and advantages thereof may best be understood by reference to the following description taken in connection with the accompanying drawing.

In the drawing, the single figure is a schematic diagram showing the improved multispeed induction motor circuit.

Referring now to the drawing, there is shown an induction motor, generally indicated at 1, which is provided in the usual manner with a rotor member 2 which has a number of conductors 3 extending therethrough with the conductors being conventionally short circuited together at their ends (not shown) to form a standard squirrel cage winding. The field member of motor 1 is provided with four different main windings 4, 5, 6 and 7 and a start winding 8. Each of the main windings is wound so as to effect a different motor speed, usually by providing a different number of poles in the winding. All the main windings and the start winding have one end connected to line 9 which, together with line 10, is intended to be connected across a source of alternating current power (not shown) in the usual manner. Rotor member 2 is connected to a speed responsive switch mechanism, such as the centrifugal mechanism 11, so that at a predetermined speed of rotation of the rotor, mechanism 11 will cause contact arms 12, 13 and 14 to be moved upwardly from a first to a second predetermined position. Contact arms 12, 13 and 14 are permanently connected to lines 15, 16, and 17 which are arranged to be accessible outside motor 1 in the usual manner so as to be connected to contacts 18, 19 and 20. In the start position of switch mechanism 11, arms 12, 13 and 14 are respectively engaged with contacts 21, 22 and 23, all of which are connected to the other side of main winding 7 from line 9. In addition, a line 24 also extends from the other side of main winding 7 and is accessible outside motor 1 in the same manner as lines 15, 16, and 17 so that it may be connected to a contact 25. A switch arm 26 may be provided at the end of line 10 so as selectively to connect line 10 to any one of contacts 18, 19, 20, or 25. The other ends of main windings 4, 5, and 6 from line 9 are respectively connected to contacts 27, 28 and 29 which are respectively engageable by contact arms 12, 13 and 14 when they are in their second operative position above the predetermined speed at which mechanism 11 operates. The other side of start winding 8 is connected to a contact 30 which engages contact arm 14 when the contact arms are in their first operative position below the predetermined speed of rotation.

The operation of the motor will now be described. With the switch arm 26 arranged to connect with contact 25, as shown, a circuit is established through line 9, winding 7, and line 24. Winding 8 is in parallel with winding 7 and is connected through contact 30, contact arm 14, and contact 23 to line 24. The motor will thus start and when it comes up to the predetermined speed for mechanism 11, the contact arms will move to their second operative position. This opens the circuit of start winding 8 but the circuit for main winding 7 is still completed through lines 9 and 24, and the motor will thus run on winding 7 alone. Assume now that instead of engagement with contact 25, switch arm 26 has been put into engagement with contact 20. The starting circuit again includes windings 7 and 8, with both windings connected across the power source through contact arm 14. When the contact arms 12, 13 and 14 move to their second predetermined position, the connections to both windings 7 and 8 are opened, and a connection through winding 6 is established through line 9 on one side and through contact 29, contact arm 14 and line 17 on the other side.

The above described arrangement for windings 6, 7 and 8 constitutes a circuit known in the prior art as one of various available two speed arrangements. It is, however, in the provision of three or more speeds that the difficulty has been encountered and that the invention in the present case relates to, thus, let it now be assumed that switch arm 26 is placed in engagement with contact 19. A circuit is then established through line 9, main winding 7, contact 22, contact arm 13 and line 16. A start winding circuit is established through line 9, winding 8, contact 30, contact arm 14, contact 23, contact 22, contact arm 13 and line 16. When mechanism 11 operates, the contact arms 12, 13, and 14 move to their second position, and the desired circuit is established through line 9, winding 5, contact 28, contact arm 13 and line 16. Thus, through the use of a single additional contact arm arranged in cooperative relation to contact arm 14, the motor 1 may be started in the desired manner even for the third speed provided by winding 5.

For each additional speed desired, it is necessary only to add a contact arm which will cooperate with contact arm 14 in the same manner as provided for winding 5. Thus, if it is desired to run the motor on winding 4, switch arm 26 is put into engagement with contact 18. A circuit is established through line 9, winding 7, contact 21, contact arm 12 and line 15. The start winding circuit is established through line 9, winding 8, contact 30, contact arm 14, contact 23, contact 21, contact arm 12 and line 15. When the contact arms move to their second position, the starting circuit is opened and the motor runs on winding 4 which is connected at one side to line 9 and at the other side to contact 27, contact arm 12 and line 15.

It will thus be seen that by means of relatively simple additions to the motor circuit, additional speeds obtained by additional windings may be provided to any extent desired, with the only limitation being the practical limit on the number of separate windings that can be inserted in one motor.

While the invention has been explained by describing a particular embodiment thereof, it will be apparent that improvements and modifications may be made without departing from the scope of the invention as defined in the appended claims.

What I claim as new and desire to secure by Letters Patent of the United States is:

1. In a multispeed induction motor, $n$ main windings, a start winding, said windings all being connected together at one end, speed responsive switch means having $(n-1)$ contact arms each having a first operative position below a predetermined motor speed and a second operative position above said predetermined motor speed, $(n-1)$ of said main windings being connected respectively at their other ends to said $(n-1)$ contact arms when said arms are in their second operative position, $(n-1)$ lines permanently connected to said $(n-1)$ contact arms respectively, another line connected directly to the other end of the other of said main windings, said other end of said other main winding also being connected to all said contact arms when they are in their first operative position, the other end of said start winding being connected to one of said contact arms when it is in its first operative position whereby, upon selection of one of said lines, said motor will start on said other main winding and said start winding and will run on whichever main winding is connected to the selected line.

2. The combination of claim 1 including a single running speed control switch for selecting the desired one of said lines to be energized when said contact arms are in their second operative position.

References Cited in the file of this patent
UNITED STATES PATENTS
1,961,793   Schaefer _____ June 5, 1934